(12) United States Patent
Miranda et al.

(10) Patent No.: US 10,884,827 B2
(45) Date of Patent: Jan. 5, 2021

(54) EXTENSIBLE ALERTS PLATFORM

(71) Applicant: HUNTINGTON BANCSHARES INCORPORATED, Columbus, OH (US)

(72) Inventors: Juan Miranda, Columbus, OH (US); Robert Lehman, Columbus, OH (US); Jill Tubaugh, Columbus, OH (US); Scott Cady, Columbus, OH (US); Dale Kelley, Columbus, OH (US); Natalie Stauffer, Columbus, OH (US)

(73) Assignee: HUNTINGTON BANCSHARES INCORPORATED, Columbus, OH (US)

( * ) Notice: Subject to any disclaimer, the term of this patent is extended or adjusted under 35 U.S.C. 154(b) by 0 days.

(21) Appl. No.: 16/716,032

(22) Filed: Dec. 16, 2019

(65) Prior Publication Data

US 2020/0192728 A1 Jun. 18, 2020

Related U.S. Application Data

(60) Provisional application No. 62/780,648, filed on Dec. 17, 2018.

(51) Int. Cl.
*G06F 9/54* (2006.01)
*G06F 9/445* (2018.01)
*G06F 9/48* (2006.01)
*G06F 9/38* (2018.01)

(52) U.S. Cl.
CPC ............ *G06F 9/542* (2013.01); *G06F 9/3822* (2013.01); *G06F 9/4451* (2013.01); *G06F 9/4881* (2013.01); *G06F 9/546* (2013.01)

(58) Field of Classification Search
CPC ........... G06F 9/465; G06F 9/542; G06F 9/546
USPC ................................ 719/313, 314, 316, 318
See application file for complete search history.

(56) References Cited

U.S. PATENT DOCUMENTS

2013/0219409 A1 * 8/2013 Woley .................... G06F 9/542
719/313

* cited by examiner

*Primary Examiner* — Andy Ho
(74) *Attorney, Agent, or Firm* — Benesch, Friedlander, Coplan & Aronoff LLP

(57) ABSTRACT

A system and method (referred to as a systems) builds alert packages that deliver messages to end-users analyzes inbound message data and identifies inbound event data objects. The systems store the inbound event data objects that are removed based on assigned priority values from a first multielement data structure. The systems process the inbound event data objects based on the assigned priority values through a cluster of event analyzer engines connected in parallel and identify the inbound event data objects associated with pre-designated notification alerts through a cluster of event analyzer engines connected in parallel. The systems store the inbound event data objects associated with the pre-designated notification alerts within a another instance of the multielement data structure. The system creates alert packages through a cluster of alert builder engines and enables and disable the processors that make up the event analyzer and alert builder engines.

20 Claims, 10 Drawing Sheets

US 10,884,827 B2

EXTENSIBLE ALERTS PLATFORM

RELATED APPLICATION

This application claims priority to provisional application Ser. No. 62/780,648 filed on Dec. 17, 2018, titled "System and Method for Alerts Platform," which is herein incorporated by reference in its entirety.

BACKGROUND OF THE DISCLOSURE

Technical Field

This disclosure relates to electronic notifications, and specifically to an extensible electronic notification architectures.

Related Art

Financial notifications make it easier for users to manage their accounts. In many applications, notifications are enabled by remote user interfaces which determine the notices recipients receive. In practice, many financial institutions subscribe to third-party electronic notification services rather than providing notifications through a centralized unitary platform. In these applications, customizations occur at their client devices. This requires client devices to expend significant resources. So, when a message is recorded and sent, the third-party providers send the messages to the selected recipients, where it is rendered and modified by user interfaces at the recipients' devices.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like-referenced numerals designate corresponding parts throughout the different views.

DETAILED DESCRIPTION

Figure 1:
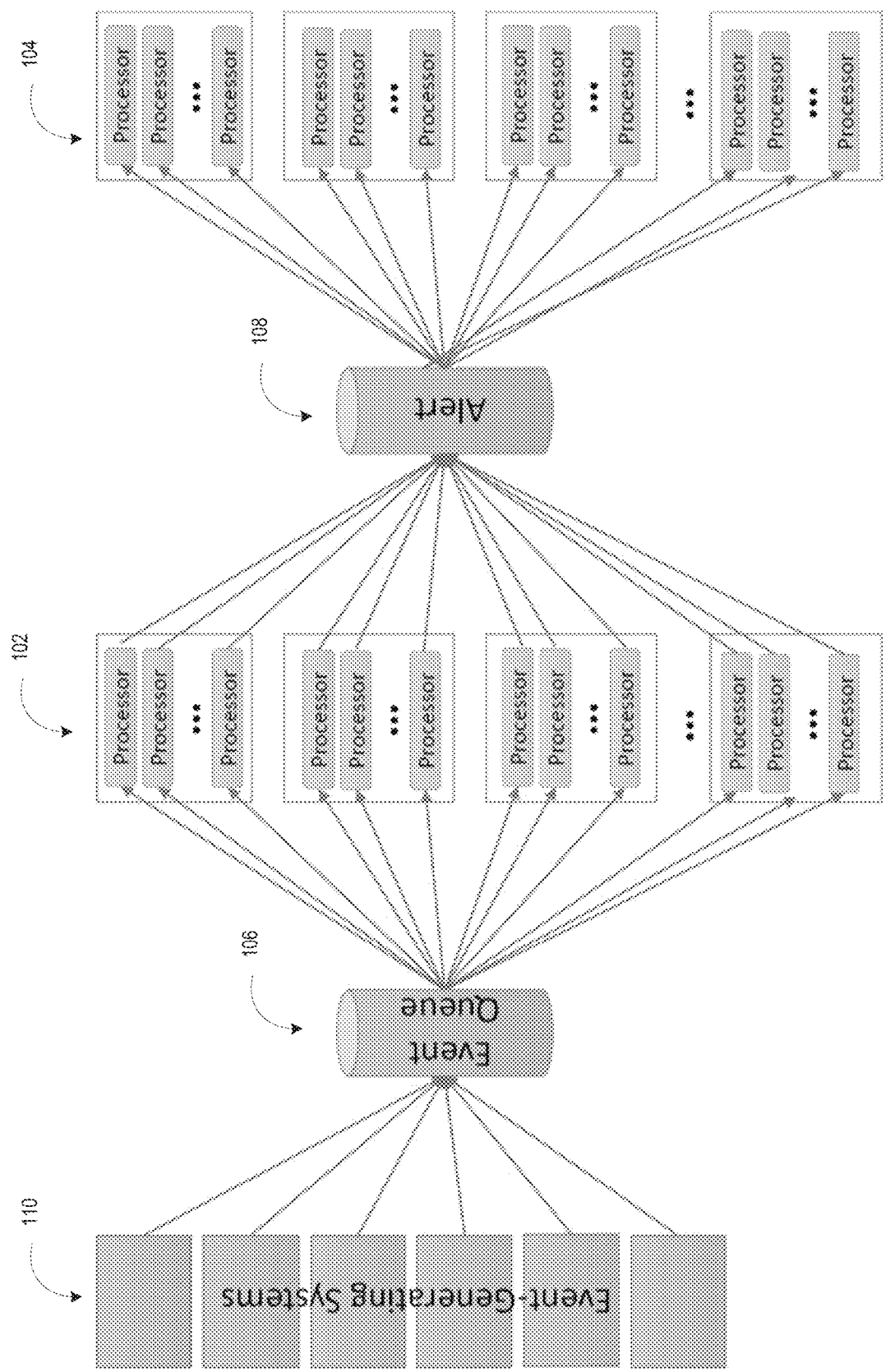
FIG. 1 is an alert system that includes event analyzer engines interfacing alert builder engines through multielement data structures.

The disclosed extensible alerts platform systems and methods (referred to as the alerts systems or systems) provide event driven processing through multiple engines and two or more multielement data structures by which objects are inserted and removed based on an assigned priority (also referred to as gates). The alert generations are easy to control (e.g., meaning easy to turn on and off) and their deliveries are easy to manage through multiple gates. The stateless nature of the systems' engines makes them adaptable to modifications and added features. The systems are extensible as engines are added and/or removed to improve system capacity by, among other things, enabling engines within the system to automatically shift work in order to balance loads. By enabling engines to take over for one another, the systems enhance network stability and minimize or eliminate downtime caused by application and system failures.

In some applications, the engines are high performing parallel engines that process hundreds of objects at a time and make decisions as to which alerts are generated based on event objects. The systems speed up decision processes by dynamically adding servers or enabling processors in the servers. In other systems decision processes are sped up by manually adding servers or enabling processors in the servers. The systems can also suspend alert types and scheduled alert deliveries in real time in response to an electronic notice.

In some systems, alert management application interfaces (also referred to as alert APIs) service multiple user channels including local, network, and/or mobile channels, for example, and in some applications, the user channels "react" to data returned from the centralized system via the APIs to establish selections and options that are made available to end-users. Through the disclosed paradigm, the systems deliver customized content at a much quicker design-to-rollout schedule through a centralized control and processing and a distributed release. The configurations allow the system to deliver alert notification to client devices including those that possess only rudimentary processing capabilities. The systems easily adapt to app requirements and render new alert types, modifications to existing alert types and/or remove alert types without requiring developers to instantiate user interfaces at client devices or make changes to them.

The systems' ability to control alert flow through several gates allows the system to respond to load spikes, unforeseen events, and faults in a way that ensures no data is lost and work in progress is not corrupted. The fault-tolerant configurations allow the system to quickly and flawlessly handle greater loads and react to changes in throughput and continue the system's operation without a loss of data or a need to shut the system down and restart it, which often results in most systems losing all of their in-progress processing and data. The systems eliminate the need to remove or continuously change recipients' user interfaces especially because of changes in the alerts and/or notifications.

FIG. 1 shows event analyzer engines 102 interfacing alert builder engines 104 through multielement data structures which objects are inserted and removed. An event generating system 110 analyzes inbound message data to identify events. The event generating system 110 may process any field, such as textual message fields to generate an inbound-event data object flow that is stored in one or more event multielement data structures by which the inbound-event data objects are inserted and removed such as in an event queue 106, for example, in a data tier as shown in FIG. 1. Clusters of event analyzer engines 102 shown as processors analyze many inbound-event data objects simultaneously through parallel processing that identifies events associated with pre-designated alerts that are then stored in an alerts queue 108 (a separate instance of a multielement data structure that stores objects in the data tier). Keeping some or every enabled processor of the system at a high utilization rate is assured by monitoring processor performance at periodic, predetermined, or dynamic timing intervals, automatically in some alternative system. In some alternate systems monitoring is executed automatically via a reverse proxy or process (acting on behalf of the processors) that in some systems, are programmed based on empirical monitoring. In some alternate systems, the monitoring reflects monitored inbound-event data object task service times executed by some (e.g., a sample) or all of the event analyzer engines 102. In some use cases, the event analyzer engines 102 are internally monitored periodically at about ten second intervals, which results in the addition of or suspension of event analyzer engines 102 and/or the assignment of additional inbound-event data objects to the processor.

In some use cases, additional instances of the multielement data structures 106 feeding the event analyzer engines 102 are served by manual intervention. In other use cases, additional instances of the multielement data structures 106 feeding the event analyzer engines 102 are served by server clusters that bring additional instances of multielement data structures and/or servers on line and retire underutilized instances of multielement data structures and/or servers when demand or loads fall. In some alternate systems, this is detected when the task service times fall below a predetermined threshold. To avoid over-provisioning resources, an optional reverse proxy or process (not shown) in other alternate systems may temporarily borrow servers originally intended to serve the data tier to serve the application tier and/or vice versa. A reallocation may occur in these alternate systems to mediate the portion of the process that constrains the operation of the entire system to mediate the limiting operations that may occur in the data tier or the application tier. This condition may occur when a load spike occurs (e.g., such as if a load were to suddenly or instantaneously increase by a predetermined percentage such as about fifty-percent, for example), which may cause one tier to temporarily borrow processing power from another tier. In an exemplary use case, the processors intended to serve an intended tier in a cluster may be partitioned to isolate a data tier from an application tier on the server or processor level and service a different tier (e.g., the overburdened tier). The automatic reallocation isolates the tiers at a granular level, eliminates inference, and mitigates load spikes.

Figure 2:
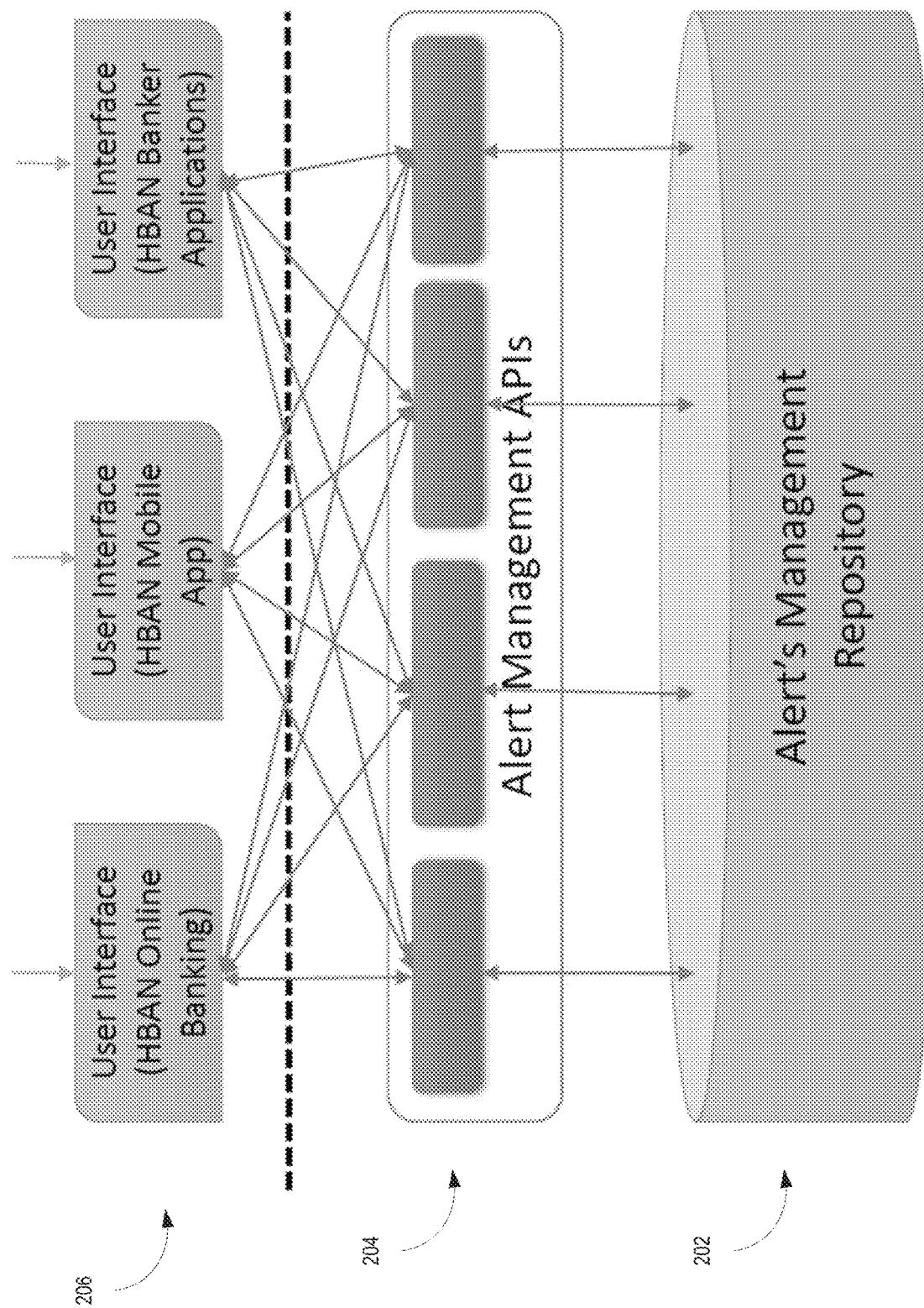
FIG. 2 represents an alert management repository interfacing application programming interfaces.

The alert building system assembles alert packages from the selected event objects that are stored in the alerts queue 108. Clusters of alert builder engines 104 shown as processors ingest the selected events stored in the alerts queue 108, and in some use cases, deduplicate the selected event objects that form a basis for the alerts. The alert builder engines 104 create alert packages that are delivered to user devices through delivery queues including those servicing email messaging, short message service (SMS) messaging, and/or push messaging. The alert package may include one, two, or more of an alert identifying media, an alert type identifier, a unique customer identifier, and an optional unique account identifier. Some alert builder engines 104 create alert packages by updating and formatting the data structures associated with an event, and some supplement the data structures with additional information. The formatting and additional information may be accessed from an alert's management repository warehouse 202 shown in FIG. 2 that is accessible through alert management APIs 204 that serves local, network, and/or mobile channels. In FIG. 2, the local, network, and/or mobile channels are shown serving mobile applications, on-line applications, and local applications shown as banker applications. In FIG. 2 the alert's management repository warehouse 202 may serve the text messaged to users, configuration files, records and other database objects, and alert message templates (e.g., files that include the overall layout to be presented in the alerts and alert messages). The templates may be selected from template libraries. The alert's management repository warehouse 202 may also serve rules governing: alert types and associated parameters, the eligibility of alert types based on user segments and account ownership, content rendered or presented to users (such as a banker and/or user messages, for example), alert names, alert descriptions, options, etc. The alert's management repository warehouse 202 may also serve the rules governing: the delivery methods, content delivered through message types such as email, SMS alerts, push alerts, and how the alerts are rendered and/or displayed.

The exemplary rules summarized above, the event analyzer engines 102, the alert builder engines 104, alert management repository warehouse 202, and the alert management APIs 204 provide centralized control of the alert generations and alert flows by providing information to user interfaces (UIs) 206 via local, network, and/or mobile channels. The UIs 206 are configured to "react" to information provided by alert management APIs without any knowledge of the alert rules, delivery mechanisms, or eligibility to receive notifications that are managed by the alert management APIs 204. The system enhances a provider's ability to add alerts or modify rules without having any impact on the remote UIs 206 or remote user apps.

The disclosed systems track session state, through systems that track the operating conditions of the backend devices, the communication channel, and the programs that process the event flows and render alerts, and in some systems that transmit the alerts to destinations. So, in the event generating system and alert building system, when the event analyzer engines 102 and the alert builder engines 104 ingest an event, the respective engines mark those events with a status indicator identifying their processing state and thereafter updates the stored session state by creating and/or updating state records that reflect their current processing states.

In the disclosed systems, removal of objects from some event queue 106 and alert queue 108 are be based on factors other than order of insertion. For instance, in the disclosed systems, a priority value is assigned to and associated with one or more event data objects. The priority value establishes the processing order of the event objects in the event and the alert queues 106 and 108. In some systems, the priority values determine when an event object is processed, and in some alternate systems also determine how long the event objects are processed.

In yet other alternate systems, a dequeue (not shown) determines which event data objects are added to or removed from either end of the dequeue's insertion input/output (I/O) port and removal I/O port of the event and/or the alert queues (e.g., a double ended queue). That is, the dequeue assigns events associated with high priority alerts to one I/O port of a queue and those of lower priority to a different I/O port during a processing session. In other words, the objects are added or removed from either or both ends of the list or queue data structure. Events objects sharing the same priority in any data flow may be removed in a last-in-first-out (LIFO) sequence, a first-in-first-out (FIFO) sequence, or a combination of LIFO and FIFO sequences during a processing session from the event and the alert queues. An alert session refers to a series of requests and responses that complete a task or a set of tasks such as the processing of event objects, alert building, and/or an alert delivery including information returned to the system from client devices. Returned information may include data indicating when an alert was delivered, where it was delivered, when it was presented to the end-user, etc. via a confirmation message. If an alert is not successfully delivered it may be reinserted into the alert queue 108 under the same priority it was originally processed and thereafter re-transmitted to a recipient provided the returned alert has not and/or will not expire (e.g., determined by a time-based analysis) before it is retransmitted to recipient's device (e.g., the client device). Similarly, a selected event object not successfully processed by an event analyzer engine 102 because of an anomaly or failure, for example such as a processor or software fault may be reinserted into the events queue 106 under the same priority it was originally processed and thereafter re-processed by the analyzer engine 106 provided the event object will not result in the issuance of an expired alert before it is transmitted to the recipient's client device. A client device is a device that accesses resources from another device via a network connection and a server is the device that responds to the client device and controls access to the network and the server's resources.

Figure 3:
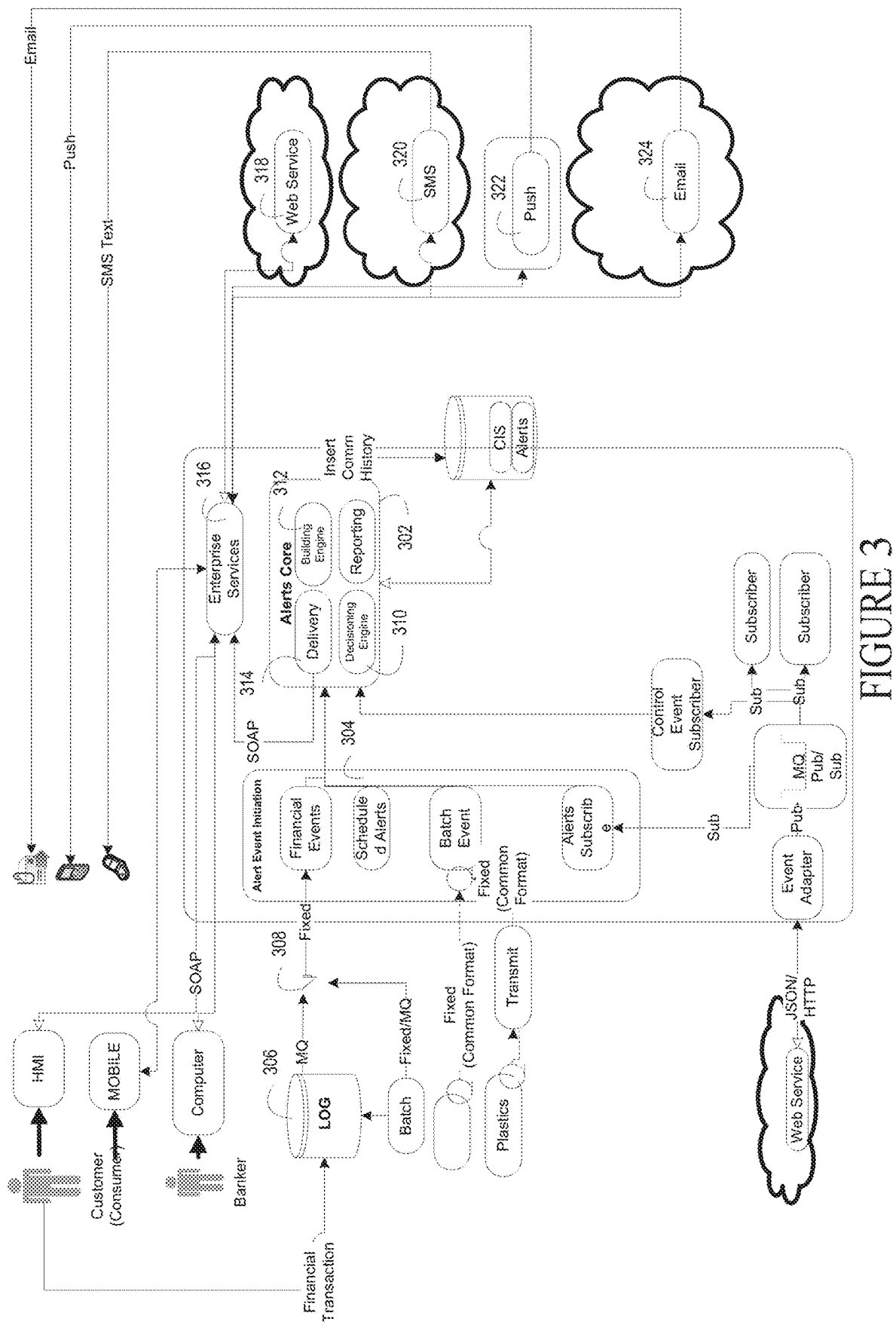
FIG. 3 is an exemplary enterprise system interfacing the event analyzer engine and an alert builder engine.

FIG. 3 is an exemplary enterprise system interfacing the event analyzer engines 102 and the alert builder engines 104 that reside in the alerts core 302. Through multiple interfaces the systems process multiple input including input associated with financial transactions. The information is transmitted and analyzed by the system in real time (analyzing data as fast or nearly as fast as the rate the content is received) or near real-time. The input is directly transmitted to an alert event initiation module 304 or stored in a database log 306 before it is processed by a messaging and queuing middleware 308 that is coupled to the alert event initiation module 304. The messaging and queuing middleware 308 support several modes of operation including point-to-point communication, publish/subscribe communication, and file transfer communication, for example. In a financial application, the event generating system is sourced from user communications, banker communication, and/or debit cards messages for example, that generate inbound-event data object flows that are stored in one or more event queues linked to the alerts core module 302.

Event analyzer engines (represented by the decisioning engine 310) analyze the inbound-event data objects simultaneously through parallel processing that identifies events associated with pre-designated alerts that are then stored in the alerts queue in the data tier. Alert building engines 312 within the alert core module 302 assembles alerts from the selected events associated with the designated alerts. The alert builder engines 312 ingest the selected events and in some use cases deduplicate the events that form a basis for the alert packages. Some alert builder engines 312 build and render the alert packages through data structures associated with additional information, functionality, templates and rules, etc. served by alert's management repository warehouse 202 and accessed via the alert management APIs 204 shown in FIG. 2 and described herein. Alert delivery in FIG. 3 occurs through a delivery module 314 within the alert core module 302. The alerts are transmitted via an enterprise services transceiver 316 that are then transmitted through web services networks 318, SMS message networks 320, push networks, 322 and/or email networks 324 to the end-user client devices (also referred to as end-user devices).

Figure 4:
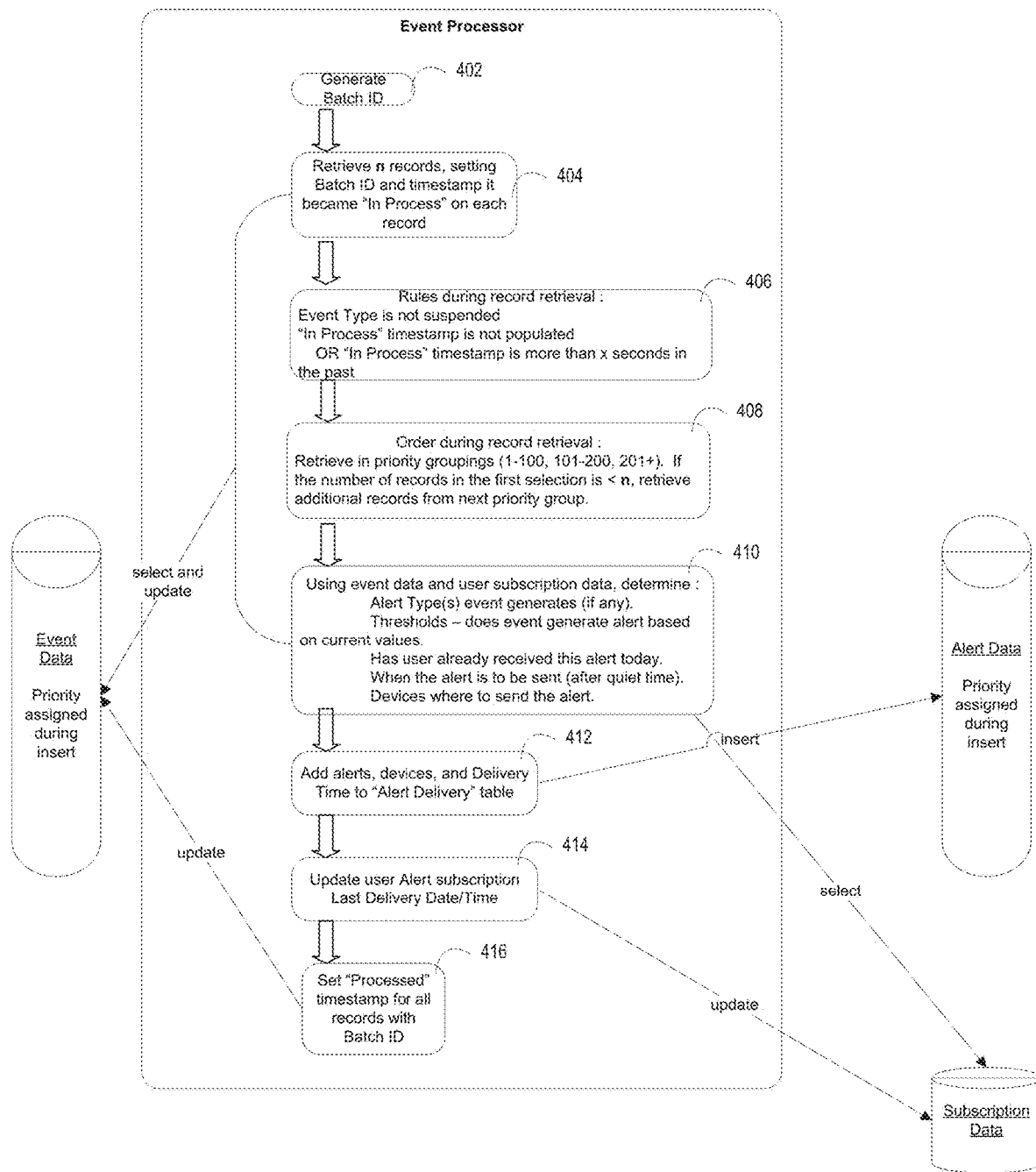
FIG. 4 is a logical representation of an alternate event analyzer engine.

FIG. 4 is a logical representation of an alternate event analyzer engine 102 that shows an exemplary process flow executed by an event processor. The process begins with the generation of a batch identifier at 402 that is a unique identifier associated with the inbound-event data objects. Through a retrieval process at 404, the process flow retrieves prioritized inbound-event data objects in batch that are stored as records, stores the time and date of their retrieval, and updates the state of the record in a memory. Through a conditional operating state analysis (e.g., assuring that an event type was not suspended) and a time-based analysis (e.g., assuring that the desired time of end-user receipt has not passed) at 406, the process obtains the priority groupings at 408 and processes the selected event data objects and user subscription data to confirm subscriptions at 410. The process flow further determines the alert type(s) to generate, confirm that the alerts are based on current records, cross-references historical records (e.g., to determine if a recipient received a similar alert), and confirms client preference states (determines if the client is receiving alerts or is in a quiet state) at 410. The process flow adds requests, identifies device recipients, and schedules delivery times at 412 in the alert queue 108. Thereafter, it updates the user subscription records at 414 and updates the session state 416.

Figure 5:
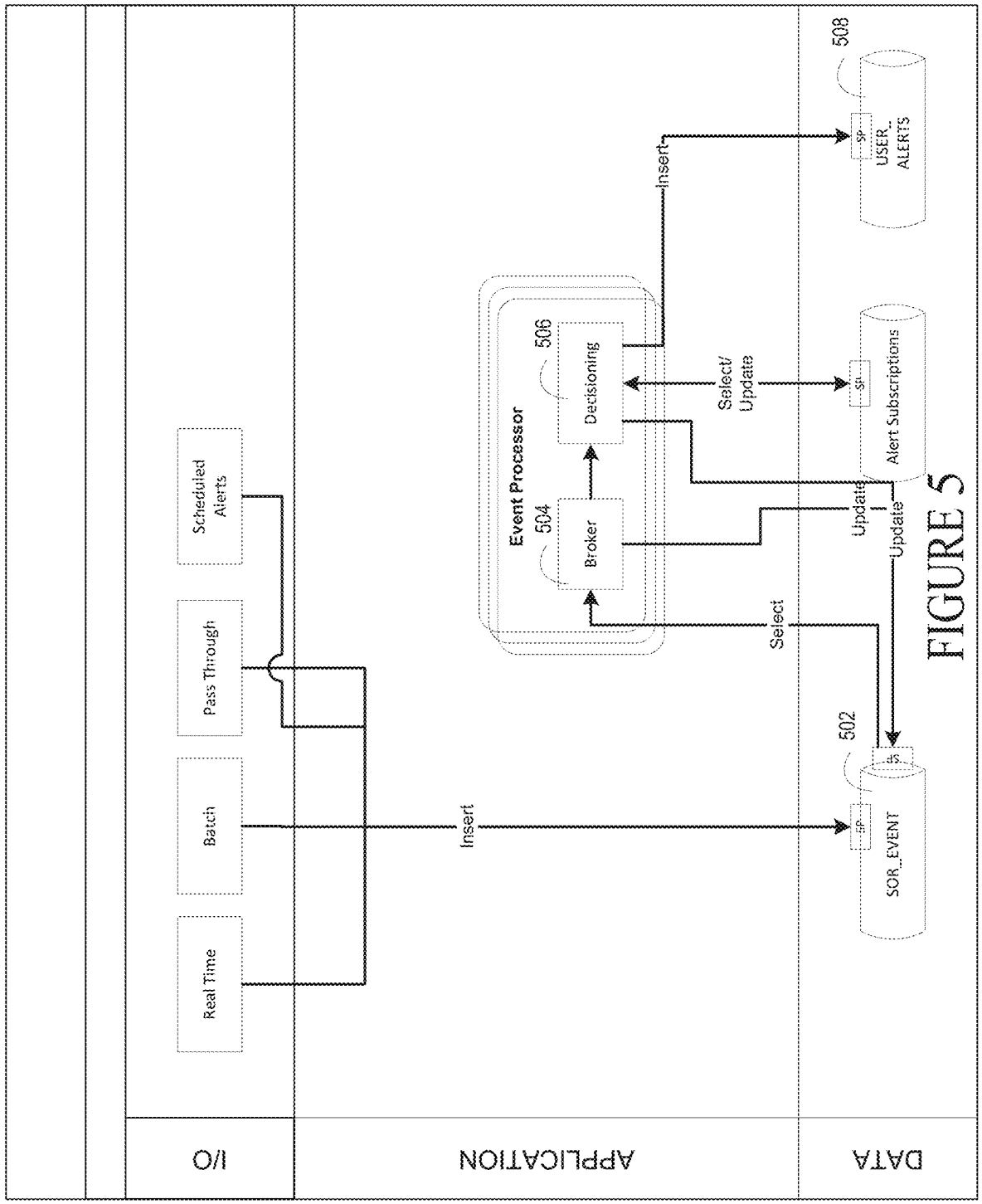
FIG. 5 is an alternate event analyzer engine interfacing devices in the input/output and data tiers.

FIG. 5 shows alternate event analyzer engines 102 in which inbound-event data objects are received in real-time, through batch files, pass throughs, and when enabling conditions occur, such as when a scheduled event occurs. The inbound-event data objects are prioritized and stored in one or more event multielement data structures by which the inbound-event data objects are inserted and removed such as an event queue 106 shown by a system of record (SOR) data warehouse 502. A broker module 504 selects a batch set of event objects by priority groupings. The selections are made from the event queue 106. The event analyzer engines (represented by the decisioning engine 506) analyze selected inbound-event data objects simultaneously through parallel processing. The processing identifies events associated with pre-designated alerts. For each event, the decisioning engine 506 executes a conditional operating state analysis (e.g., assuring that an event type was not suspended), confirms subscriptions to the alert types, executes time-based analysis (e.g., assuring the alert data's currency), sets a delivery time based on user preferences, and writes a record to the user alerts data warehouse 508 for each device that the alert will be transmitted to. When batches of the prioritized inbound-event data objects are processed, the alternate event analyzer engines 106 updates the session state by updating the details of the session state of the event analyzer in the SOR event data warehouse 502.

Figure 6:
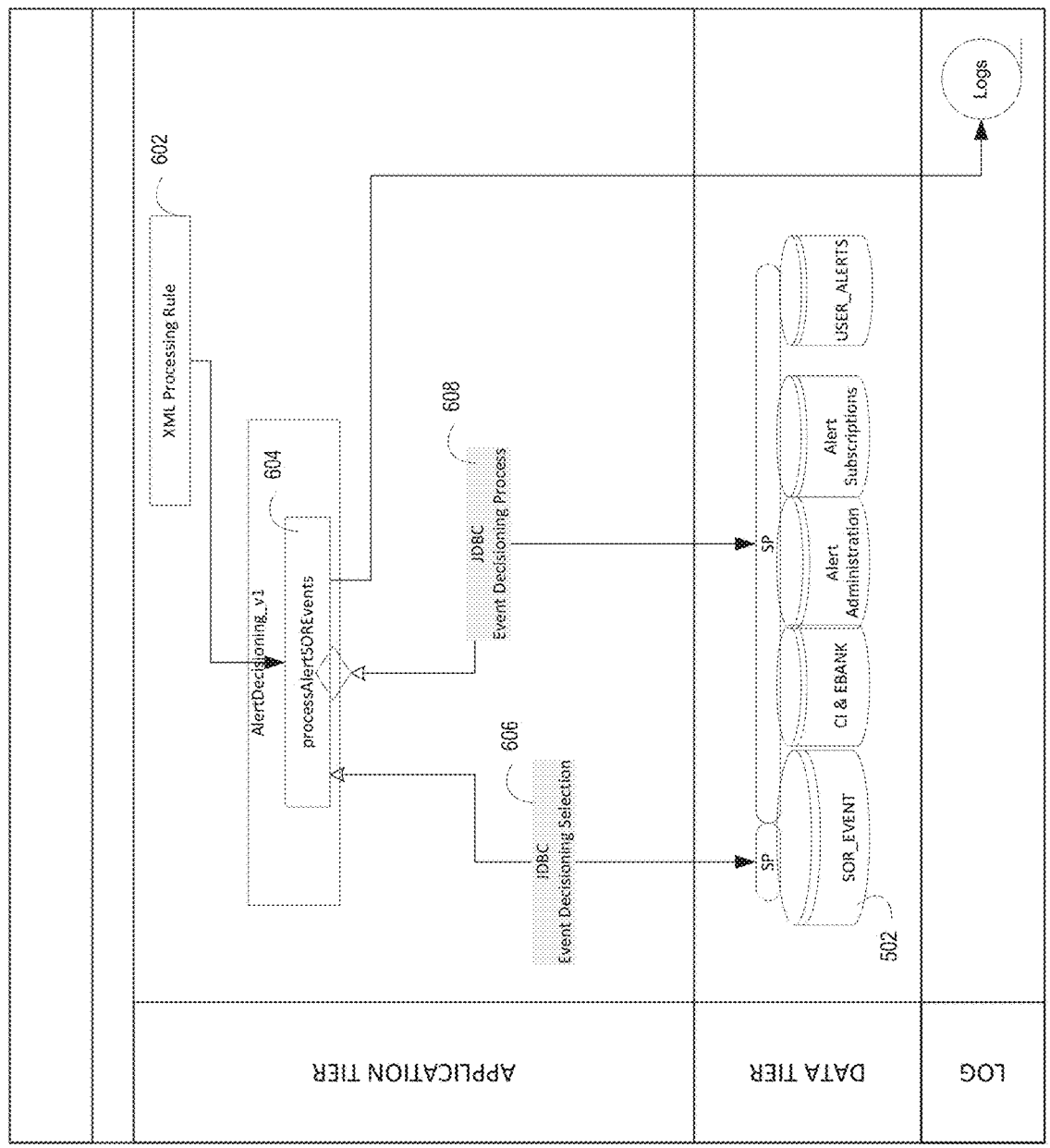
FIG. 6 is an alternate event analyzer engine interfacing the data tier and the log tier.

FIG. 6 is an alternate modular event analyzer 106 triggered by an extensible markup language alert that may occur on a periodic schedule by rule at 602. The execution begins with the creation of event analyzer batch identifier at 604. The alternate modular event analyzer execution calls an event decisioning selection routine at 606 that retrieves a batch set of event objects by priority groupings. When more than one event object records are retrieved, an event analyzer process (represented by the event decisioning process at 608 shown in FIG. 6) analyze selected inbound-event data objects simultaneously through parallel processing and updates session state in the SOR warehouse 502.

The event decisioning selection routine selects a batch of "n" records based on an assigned priority. The selected batch records are either not yet been picked up or were picked up a predetermined time before but were not processed. For each batch of records, a stored procedure updates an event table in the SOR data warehouse 502 that stores records that include fields that include a picked-up timestamp and a decisioning batch identifier. Every record in a decisioning batch will share the same batch timestamp and decisioning batch identifier.

The alert decisioning process of FIG. 6 retrieve the alert event records from SOR data warehouse 502 that are in the decisioning batch. For each alert of record, the event decisioning process 608 determines if an event should generate an alert. The determination is based on whether an alert has been suspended at creation and if the user has an alert subscription through an active alert device associated with the alert event. If applicable, the event decisioning process 608 applies threshold values programmed by the user for the alert subscriptions and determines the frequency in which alerts are sent within specific time periods. If an alert is to be generated, the event decisioning process at 608 determines the time the alert can be picked up for delivery based on user preferences and the alert's delivery expiry time. The event decisioning process routine at 608 also inserts a record into the user alerts table and for the entire decisioning batch, updates the SOR data warehouse table with the processed timestamp.

Figure 7:
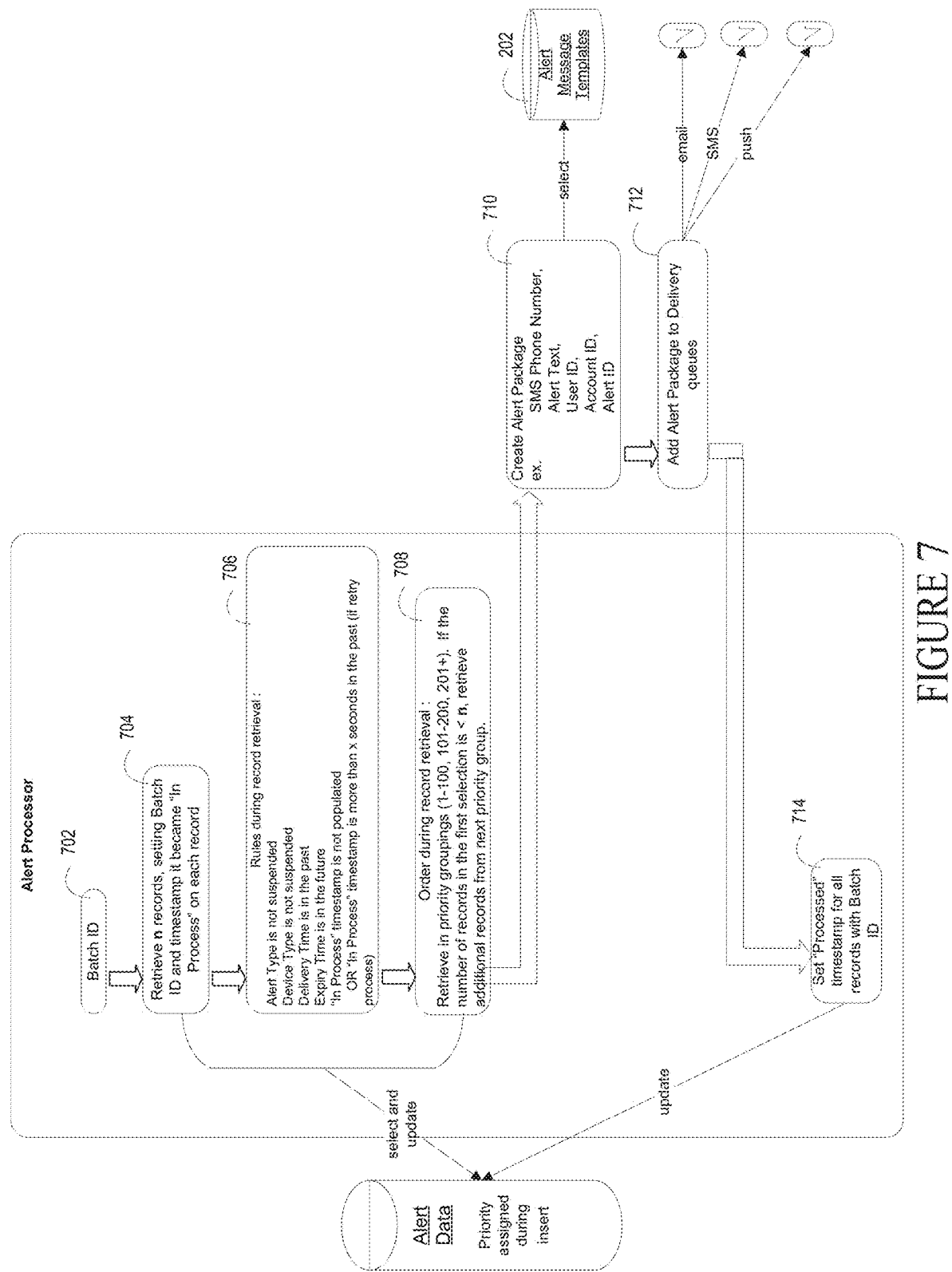
FIG. 7 is a logical representation of an alternate alert builder engine.

FIG. 7 is a logical representation of an alternate alert builder engine 104 that shows an exemplary process flow executed by an alert processor. The process begins with the generation of a batch identifier at 702 that is a unique identifier associated with the event data objects processed by the event analyzer engine (referred to as pre-processed event data objects). Through a retrieval process at 704, the process flow retrieves the pre-processed event data objects in batch that are stored as records, stores the time and date of retrieval, and updates the session state of the record in a memory. Through process rules at 706, the alert processor executes a conditional operating state analysis and a time-based analysis. The operating state analysis assuring that an event type was not suspended. The time-based analysis assures that the desired time of intended delivery has not past, the expiry time occurs in the future, and the time stamp associated with a previously processed record occurred in the past. The alert builder process obtains the priority groupings at 708 and creates an alert package at 710 that is delivered to user devices through delivery queues at 712. Exemplary delivery queues shown in FIG. 7 include queues servicing email messaging, SMS messaging, and push messaging. Thereafter, the process updates the user subscription records and updates the session state at 714 for the records having a batch identifier.

Figure 8:
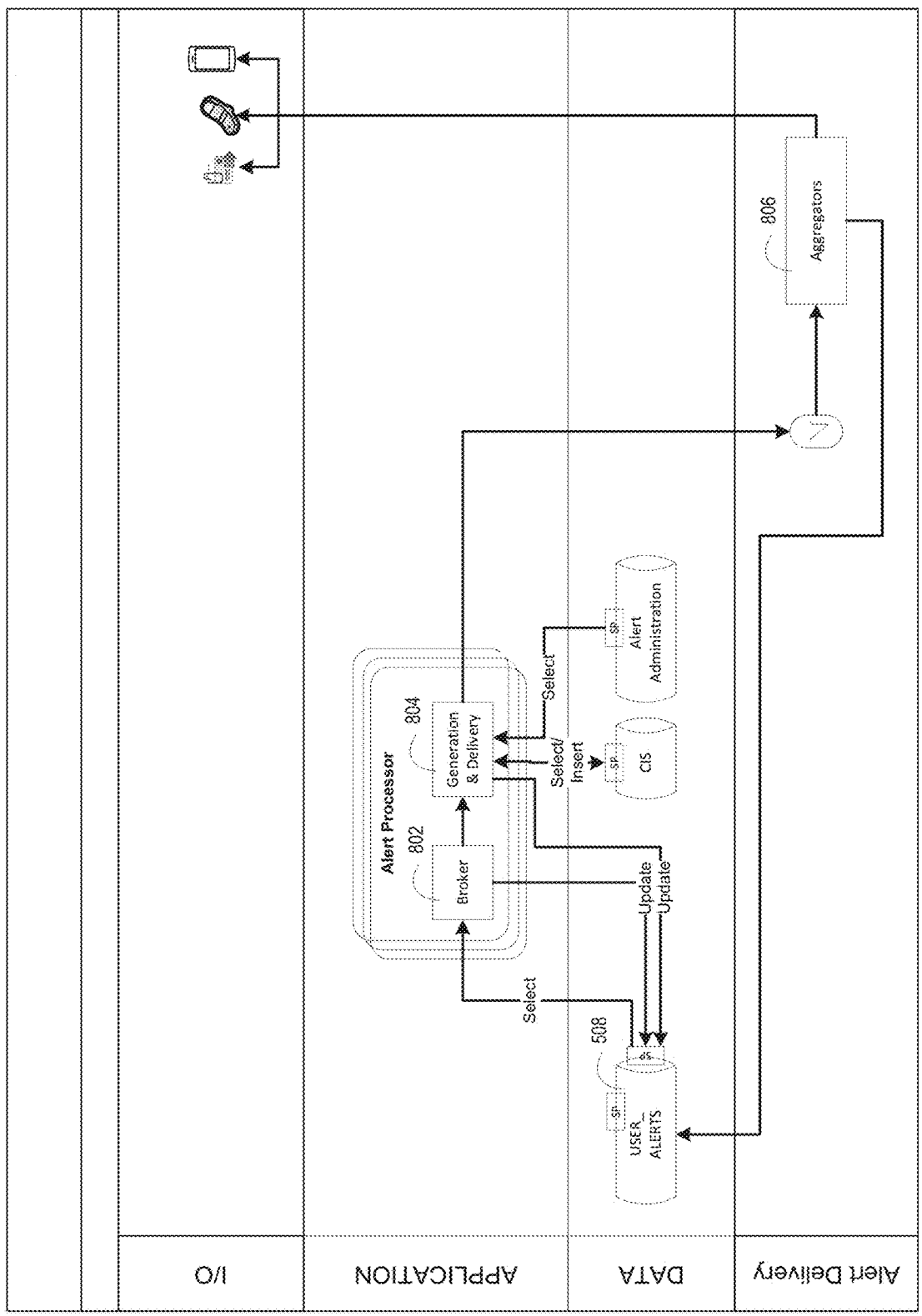
FIG. 8 is an alert builder.

FIG. 8 is an alternate alert builder 106. A broker module 802 selects a batch set of records by priority groupings. The selections are made from the alert queue 108 residing in a user-alerts data warehouse 508. The alert delivery engines (represented by the generation and delivery engine 804) retrieve end-user device details, construct message packages in some use cases based on templates, and sends the message packages to an aggregator transceiver 806. The aggregator transceiver 806 delivers the message packages to user devices through delivery queues including those servicing email messaging, SMS messaging, and push messaging, for example. If delivery is unsuccessful or goes unacknowledged, the message packages are updated and are retransmitted if the message packages have not expired. Thereafter, the process updates the user subscription records and updates the session state for the records having a batch identifier in the customer-alerts data warehouse.

Figure 9:
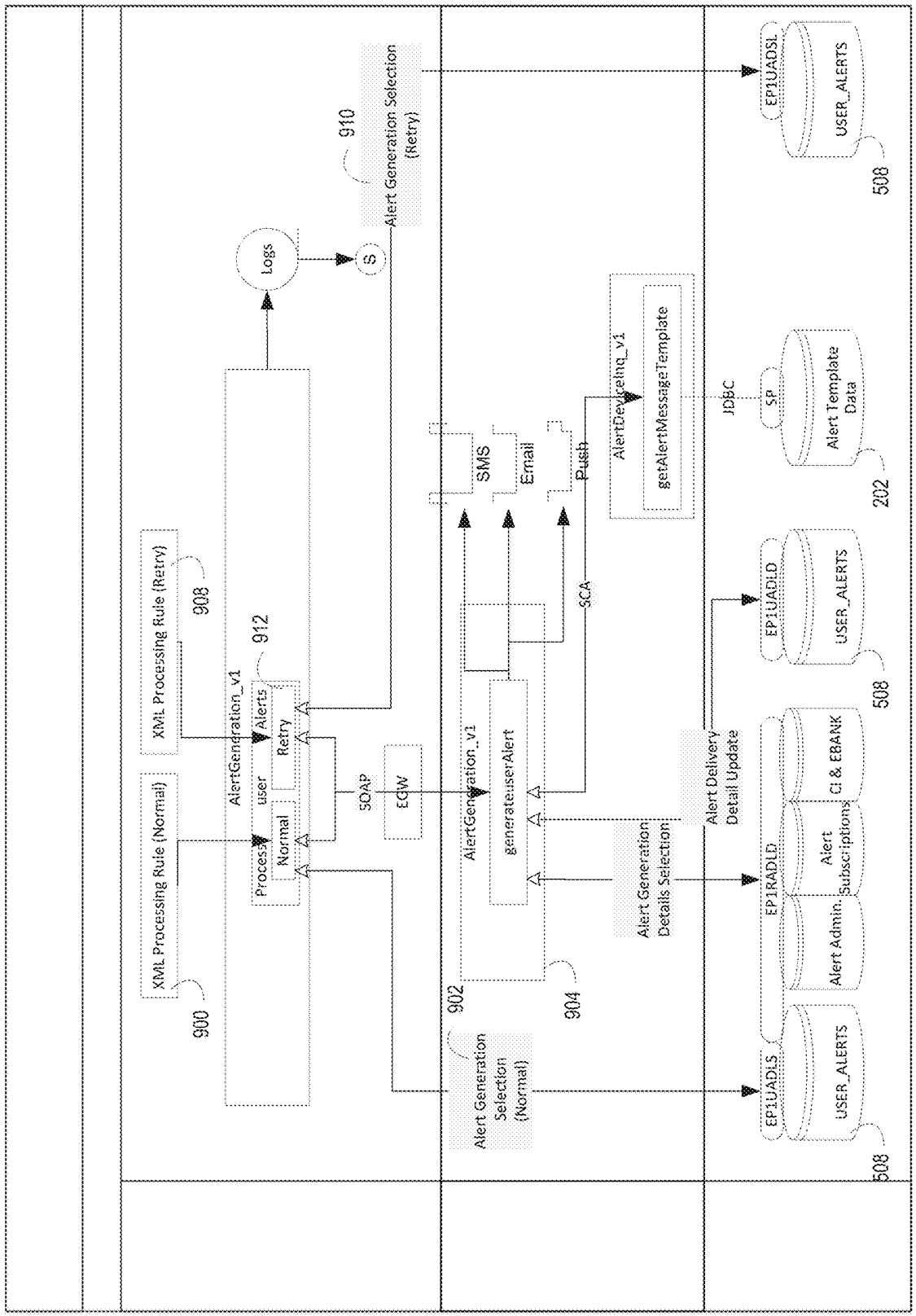
FIG. 9 is an alternate alert builder.

FIG. 9 is an alternate alert builder triggered by an extensible markup language alert that may occur on a periodic schedule via a normal processing or a retry process. The alternate alert builder's processing begins with the creation of a delivery batch identifier via a processing rule 900 in a normal flow. The alternate event builder 104 calls an alert delivery selection routine 902 and if records are returned, calls a generate user alert routine 904. The alternate event builder process thereafter writes the delivery counts to a user log.

If redelivery of an alert is required, a retry process is triggered by an extensible markup language rule 908 that may be executed on a periodic schedule. The retry process begins with the creation of an alert delivery batch identifier. The retry event builder process calls a retry alert delivery selection routine 910 and if records are returned, calls a generate user alert routine 904. The alternate retry process thereafter writes the delivery counts to a log.

The alert delivery selection routine of FIG. 9 selects a batch of "n" records from a user alerts table based on alert priority groupings. The selected batch includes records that have not been picked up and have not been suspended for delivery by an alert type or device type. The alert delivery selection routine assures that the intended delivery time has not passed and the expiry time occurs in the future. For the batch records, the alert delivery selection routine updates the end-user table by updating the picked-up time stamp and the delivery batch identifier fields. Each batch record in the processing batch will have the same timestamp and delivery batch identifier.

The retry alert delivery selection routine of FIG. 9 selects a batch of "n" records from a user alerts table based on alert priority groupings. The selected batch includes records that were picked up but not processed for a predetermined amount of time and have not been suspended for delivery by an alert type or device type. The retry alert delivery selection routine assures that the intended delivery time has not passed and the expiry time occurs in the future. For the batch records, the retry alert delivery selection routine updates the end-user table by updating the picked-up time stamp and the delivery batch identifier fields. Each batch record in the processing batch will have the same timestamp and delivery batch identifier.

The generate user alert routine of FIG. 9 calls an access procedure through the alert delivery detail selection for each delivery detail record. With the delivery details accessed the routine retrieves the template details and creates an alert package 710 based on the template and the variable data (if applicable). Based on the device type and operating state, the message is added to a messaging queue. If the device is not active, the details of the intended delivery are updated.

Figure 10:
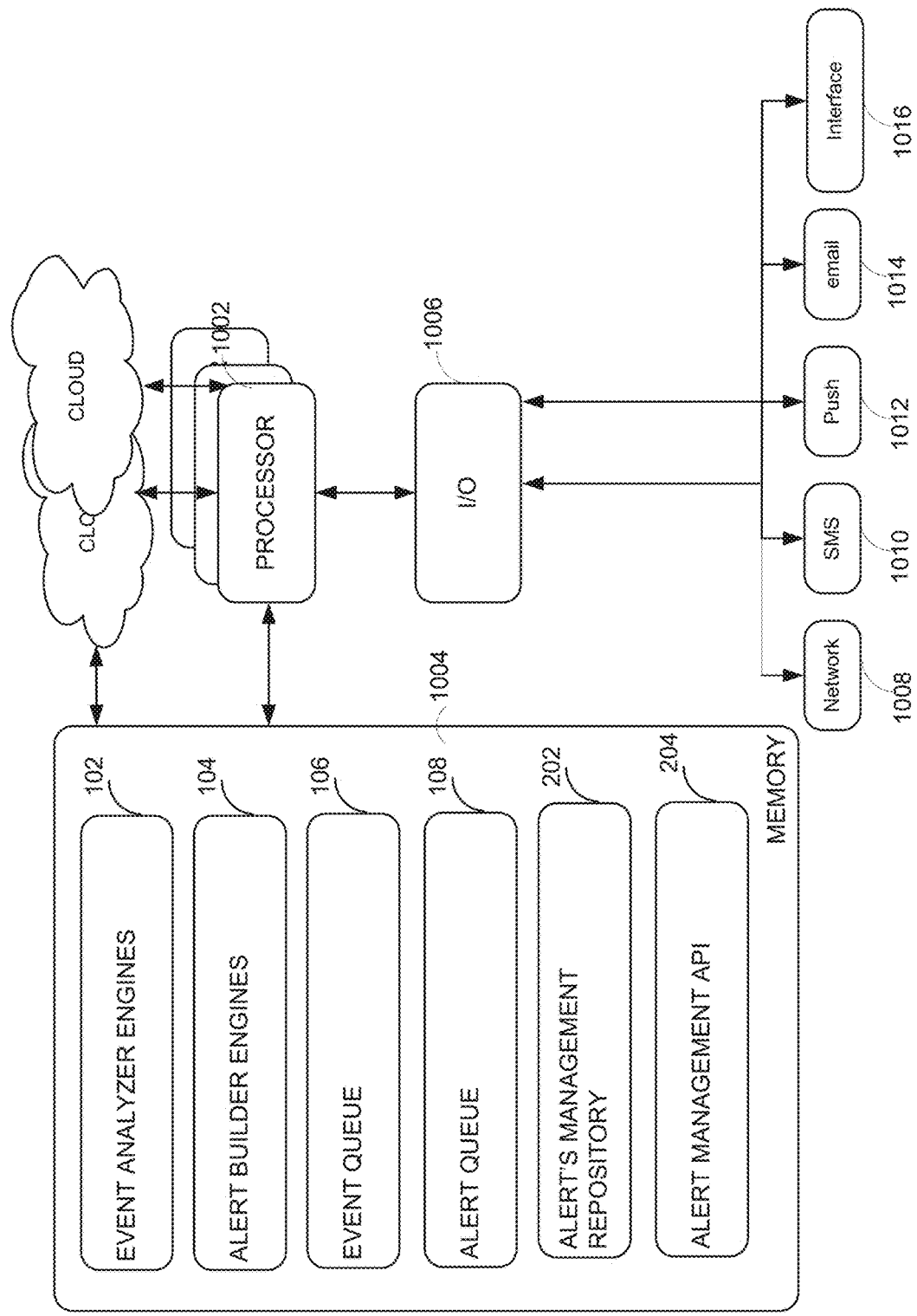
FIG. 10 is an alert system that includes event analyzer engines interfacing alert builder engines through multielement data structures.

FIG. 10 is a block diagram of a system that may execute the process flows and system functionality described above and those shown in FIGS. 1-9 automatically. The system comprises one or more processors 1002 (referred to as a processor), a non-transitory media, such as a memory 1004 (the contents of which are accessible and are executable by the processor 1002), and an I/O interface 1006. The I/O interface 1006 connects devices and points of interaction, such a network device 1008, a SMS enabled device 1010, a push enabled device 1012, and an email enabled device 1014 and/or an interface 1016 (e.g., a human machine interface or HMI), to remote applications and/or end-user client devices. The memory 1004 store instructions, which when executed by the processor 1002, causes the system to render some or all of the functionality associated with generating and issuing alerts. The memory 1004 stores instructions, which when executed by the processor 1002, causes the system to render the functionality associated with the event analyzer engines 102, alert builder engines 104, multielement data structures 106 and 108, the alert's management repository 202, and the alert management APIs 204 and the elements shown and/or described in FIGS. 1-9 that are not shown in FIG. 10.

The memory 1004 and/or storage disclosed may retain an ordered listing of executable instructions for implementing the functions described above in a non-transitory computer code. The machine-readable medium may selectively be, but is not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 1004 may comprise a single device or multiple devices that may be disposed on one or more dedicated memory devices or disposed on a processor or other similar device and alternatively, a memory of any type.

When functions, steps, etc. are said to be "responsive to" or occur "in response to" another function or step, etc., the functions or steps necessarily occur as a result of another function or step, etc. It is not sufficient that a function or act merely follow or occur subsequent to another. The term "cluster" refers to a group of independent processors that operate and appear to their clients as a single unit and improve the processing capacity of the system by enabling processors within a cluster to shift work to balance processing load. Further, the term "engine" generally refers to a device, processor, and/or program executed by a hardware processor that manages and manipulates data as programmed to execute the functionality associated with the device. Computer-mediated technology enables human communication that occurs through two or more electronic devices. The devices may provide input from various sources including, but not limited to, audio, text, images, video, etc. A session is the time during which a program accepts input and processes information. For alert application, it is the time during which a provider generates and issue alerts rather than the entire time an alert may reside at a recipient's device and/or acknowledge an alert. The term "about" encompasses variances between one and five percent or an exact percent in that range that excludes other percentages in that range that may be associated with the particular variable.

While each of the systems and methods shown and described herein operate automatically and operate independently, they also may be encompassed within other systems and methods including any number of iterations of some or all of the process used to recognize input, render recognized results, and/or render an output such as a title registration, for example. Alternate systems may include any combination of structure and functions described or shown in one or more of the FIGS. These systems are formed from any combination of structures and functions described. The structures and functions may process the same, additional, or different input and may include the data integrations from multiple distributed sources to provide real time or near real time alerts and related activities. Alternate systems illustratively disclosed herein may be practiced in the absence of any element and functionality which is not specifically disclosed herein. In some alternate systems, when elements and/or functions are not disclosed herein, those alternate systems are devoid of or operate in the absence of those non-disclosed elements and/or functions. In yet another alternate system, the disclosed elements and functions are recited individually, rather than as an inseparable whole. In these alternate systems, one or more but not all of the recited elements and/or functions disclosed herein may be completely lacking or may be excluded from these alternate systems.

The functions, acts or tasks illustrated in the FIGS. or described herein may be executed in response to one or more sets of logic or instructions stored in or encoded on non-transitory computer readable media or non-transitory machine-readable medium. The functions, acts, or tasks are independent of the particular type of instructions set, storage media, processor or processing strategy, and may be performed by software, hardware, integrated circuits, firmware, micro code and the like, operating alone or in combination.

The disclosed systems provide event driven processing through multiple engines and multielement data structures. The stateless nature of the systems' engines makes them adaptable to modifications and new features. The systems are extensible as engines are added and/or removed to improve system capacity by, among other things, enabling engines within the system to shift work in order to balance loads. By enabling engines to take over for one another, the systems enhance network stability and minimize or eliminate downtime caused by application and system failures.

In some applications, the engines are high performing parallel engines that process hundreds of objects at a time and make decisions as to which alerts are generated based on event objects. The systems can be enhanced to speed up decision processes by adding servers or enabling processors. The systems can also suspend alert types and scheduled alert deliveries in real time.

Alert APIs service multiple user channels including local, network, and/or mobile channels. Through the disclosed architecture, the systems deliver customized content quickly and efficiently. The systems easily adapt to user needs and render new alert types, modifications to existing alert types and/or remove alert types without requiring developers to instantiate user interfaces at client devices.

The systems' ability to control alert flow through several gates allows the system to respond to load spikes, unforeseen events, and faults in a way that ensures no data is lost and work in progress is not corrupted. The fault-tolerant configurations allow the system to quickly handle greater loads and react to changes in throughput and continue the system's operation without a loss of data or a need to shut the system down and restart it. The systems eliminate the need to remove or continuously change recipients' user interfaces especially when there are changes in the alerts and/or notifications.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system that builds alert packages that is processed to deliver messages to end users through an end user's remote electronic accounts comprising:
    an event generating system that analyzes inbound message data and identifies inbound event data objects;
    a first multielement data structure from which the inbound event data objects are removed based on an assigned priority values to each of the inbound event data objects;
    a cluster of event analyzer engines working in parallel that process the inbound event data objects based on the assigned priority values and identify the inbound event data objects associated with one or more pre-designated notification alerts;

a second multielement data structure separate from the first multielement data structure from which the inbound event data objects associated with the one or more pre-designated notification alerts are removed based on the assigned priority values of the inbound event data objects;

a cluster of alert builder engines that create alert packages that are transmitted to a plurality of end-user devices through a plurality of delivery queues; and a reverse proxy capable of enabling and disabling a plurality of processors that comprise at least one or more of the cluster of event analyzer engines and at least one or more of the cluster of alert builder engines.

2. The system of claim 1 where the alert package comprises an alert identifying media, an alert type identifier, and a unique customer identifier.

3. The system of claim 1 where the alert package comprises two or more of an alert identifying media, an alert type identifier, a unique customer identifier, or a unique account identifier.

4. The system of claim 1 where the first multielement data structure and the second multielement data structure comprise a double ended queue where the inbound event data objects are added to and removed from both ends of a queue data structure.

5. The system of claim 1 further comprising an alert management repository that serves alert message templates included in the alert packages.

6. The system of claim 1 where the reverse proxy avoids an over-provisioning of resources by automatically assigning processors that serve the first multielement data structure to execute functions performed by one or more of the cluster of event analyzer engine.

7. The system of claim 1 where the delivery queues deliver the alert packages through an electronic mail messaging channel, a short message service messaging channel, and a push messaging channel.

8. A method that builds alert packages that is processed to delivers messages to end-users comprising:

analyzing inbound message data and identifies inbound event data objects; storing the inbound event data objects that are removed based on an assigned priority values to each of the inbound event data objects from a first multielement data structure;

processing the inbound event data objects based on the assigned priority values through a cluster of event analyzer engines connected in parallel;

identifying the inbound event data objects associated with one or more pre-designated notification alerts through the cluster of event analyzer engines connected in parallel;

storing the inbound event data objects associated with the one or more pre-designated notification alerts are removed based on the assigned priority values of the inbound event data objects within a second multielement data structure separate from the first multielement data structure;

creating alert packages through a cluster of alert builder engines; the alert packages are transmitted to a plurality of end-user devices through a plurality of delivery queues; and enabling and disabling a plurality of processors that comprise at least one or more of the cluster of event analyzer engines and at least one or more of the cluster of alert builder engines.

9. The method of claim 8 where the alert package comprises an alert identifying media, an alert type identifier, and a unique customer identifier.

10. The method of claim 8 where the alert package comprises two or more of an alert identifying media, an alert type identifier, a unique customer identifier, or a unique account identifier.

11. The method of claim 8 where the first multielement data structure and the second multielement data structure comprise a double ended queue where the inbound event data objects are added to and removed from both ends of a queue data structure.

12. The method of claim 8 further comprising an alert management repository that serves alert message templates included in the alert packages.

13. The method of claim 8 where a reverse proxy avoids an over-provisioning of resources by automatically assigning processors that serve the first multielement data structure to execute functions performed by one or more of the cluster of event analyzer engine.

14. The method of claim 8 where the delivery queues deliver the alert packages through an electronic mail messaging channel, a short message service messaging channel, and a push messaging channel.

15. A non-transitory machine-readable medium encoded with machine-executable instructions for generating alert packages, where execution of the machine-executable instructions cause a processor to execute a method, the method comprising:

analyzing inbound message data and identifies inbound event data objects; storing the inbound event data objects that are removed based on an assigned priority values to each of the inbound event data objects from a first multielement data structure;

processing the inbound event data objects based on the assigned priority values through a cluster of event analyzer engines connected in parallel;

identifying the inbound event data objects associated with one or more pre-designated notification alerts through the cluster of event analyzer engines connected in parallel;

storing the inbound event data objects associated with the one or more pre-designated notification alerts are removed based on the assigned priority values of the inbound event data objects within a second multielement data structure separate from the first multielement data structure;

creating alert packages that are transmitted to a plurality of end-user devices through a plurality of delivery queues; and enabling and disabling a plurality of processors that comprise at least one or more of the cluster of event analyzer engines.

16. The non-transitory machine-readable medium of claim 15 where the alert package comprises an alert identifying media, an alert type identifier, and a unique customer identifier.

17. The non-transitory machine-readable medium of claim 15 where the alert package comprises two or more of an alert identifying media, an alert type identifier, a unique customer identifier, or a unique account identifier.

18. The non-transitory machine-readable medium of claim 15 where the first multielement data structure and the second multielement data structure comprise a double ended queue where the inbound event data objects are added to and removed from both ends of a queue data structure.

19. The non-transitory machine-readable medium of claim 15 further comprising an alert management repository that serves alert message templates included in the alert packages.

20. The non-transitory machine-readable medium of claim 15 where a reverse proxy avoids an over-provisioning of resources by automatically assigning processors that serve the first multielement data structure to execute functions performed by one or more of the cluster of event analyzer engine.

* * * * *